Figure 1:
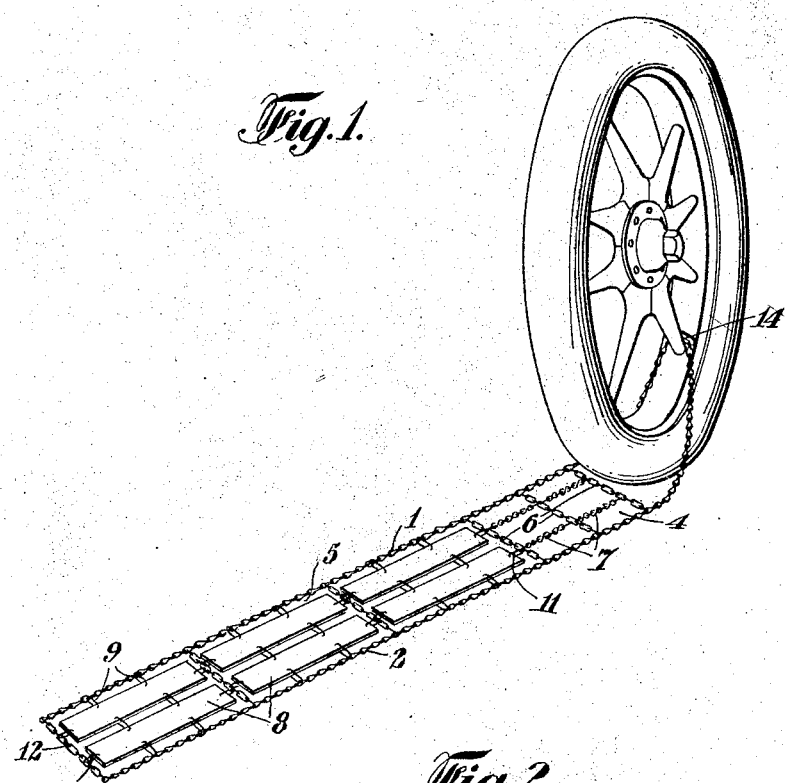

June 29, 1926.

P. FISCHER

ANTISLIP DEVICE FOR VEHICLES

Filed Feb. 28, 1925

1,590,434

INVENTOR
Paul Fischer
BY
Ramsay Hoguet
ATTORNEY

Patented June 29, 1926.

1,590,434

UNITED STATES PATENT OFFICE.

PAUL FISCHER, OF NEW YORK, N. Y.

ANTISLIP DEVICE FOR VEHICLES.

Application filed February 28, 1925. Serial No. 12,455.

This invention relates to an anti-slip device for vehicles.

The principal object of the invention resides in the provision of a device which may be attached to the driving wheel of a vehicle to provide traction where the nature of the surface on which the vehicle rests is such that insufficient traction exists between the wheel of the vehicle and the surface to afford sufficient traction for the wheel to be effective to propel the vehicle.

Further objects of the invention will appear as the description progresses and it is not deemed necessary to here enumerate them in extenso.

Figure 2:
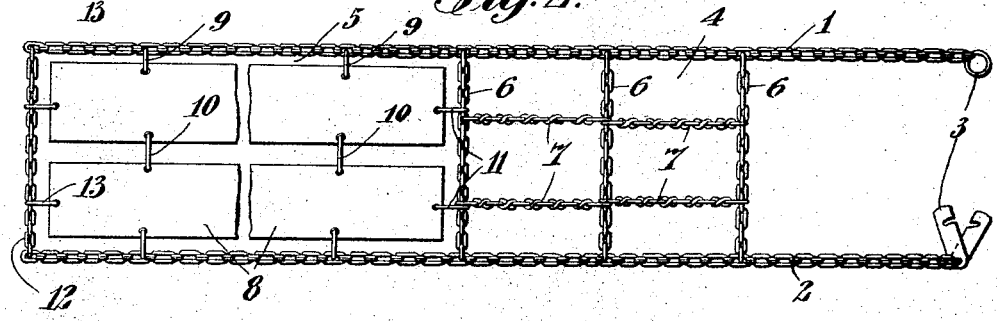

In the drawing,

Fig. 1 is a perspective view of an embodiment of my invention showing the same attached to an automobile wheel, and Fig. 2 is a plan view partly broken away showing the construction of this embodiment.

The embodiment of the device illustrated in the drawing includes flexible elements such as chains 1 and 2. On one end of each of these chains is attached a fastener element 3. These fastener elements are adapted to be secured together to attach the device to the automobile wheel in a manner which will later appear. Mounted between and attached to these flexible elements 1 and 2 are two thread sections which are indicated generally by the reference characters 4 and 5.

As the wheel is rotated it will draw the device between it and its supporting surface and will at first engage the section 4. This section is formed of elements such as chains 6 and 7 and therefore presents to the wheel a very rough and perfect traction surface. As the wheel engages this section the latter will be substituted for the non-tractive surface on which the wheel has been previously supported and the continued rotation of the wheel will cause the advance of the same on the device. As the wheel advances it will pass from the section 4, and having some momentum at this time, will pass on to the section 5. This section, being of sufficient length, will afford traction for the wheel until it is gotten to a traction surface.

The section 5 is made up preferably of a plurality of relatively rigid plates 8 which are arranged in parallel series longitudinally of the device, and in pairs transversely of the device. These plates are attached to the side members 1 and 2 by links 9 and the members of the pairs are attached together by links 10. The ends of the plates adjacent the transverse element 6 are attached to the latter by links 11. Thus, during the operation of the device while the wheel is revolving the section 5 is permitted to have a longitudinal flexing at a multiplicity of points, and a transverse flexing between the pairs of plates.

In the foregoing I have described the elements 1 and 2 of the drawings and the elements 6 and 7, as chains, but it is of course to be understood that this is simply a description of a convenient construction, for these elements may quite obviously be made of other constructions.

Furthermore, while I have described the elements 8 of the section 5 as plates, they may be replaced by any other suitable elements, such as transverse bars which will afford the required tractive surface.

While I have illustrated and described a particular form of my invention it has been merely for the sake of convenience and I do not wish to be limited in this construction except in so far as is necessitated by the claims.

What I claim is:

1. An anti-slip device including a pair of flexible side elements having means for securing adjacent ends together, a tread section consisting of a plurality of plates secured between the side elements, said section being capable of longitudinal and transverse flexing.

2. An anti-slip device including a plurality of plates arranged in longitudinal series and in transverse pairs, means for securing the plates together longitudinally and transversely, and means for attaching the plates to a wheel.

3. An anti-slip device including flexible side elements, a tread section including flexible transverse elements extending between and carried by said side elements, and flexible longitudinal elements extending between and secured to said transverse elements, and a tread section including a plurality of rigid plates loosely attached to the side elements and loosely attached together.

In testimony whereof, I have signed my name to this specification this 25th day of February 1925.

PAUL FISCHER.